United States Patent

Yamasaki et al.

[15] 3,693,438
[45] Sept. 26, 1972

[54] KARMAN'S VORTICES GENERATING DEVICE

[72] Inventors: Hiroo Yamasaki; Yoshio Kurita; Yutaka Ishikawa; Takehiro Sawayama, all of Tokyo, Japan

[73] Assignee: Yokogawa Electric Workds, Ltd., Tokyo, Japan

[22] Filed: April 23, 1971

[21] Appl. No.: 136,980

[30] Foreign Application Priority Data

May 9, 1970 Japan.....................45/39601

[52] U.S. Cl. ................................73/194 B
[51] Int. Cl..................................G01f 1/00
[58] Field of Search..................73/194 B, 194 C

[56] References Cited

UNITED STATES PATENTS 3,116,639   1/1964   Bird............................73/194

Primary Examiner—Richard C. Queisser
Assistant Examiner—Herbert Goldstein
Attorney—Bryan, Parmelee, Johnson and Bollinger

[57] ABSTRACT

A vortex generating element of the type used in flow metering apparatus and having a generally elongate cylindrical shape mounted in a stream of flowing fluid so as to produce Karman's vortices at a rate proportional to the velocity of the flowing fluid, with means detecting the production of vortices to give a linearly related measure of fluid velocity. To improve the correspondence of vortex production rate with flow velocity over wide conditions of flow, the element is formed on opposite sides thereof with recessed surface portions meeting the upstream surface of the element in an edge which lies substantially where the boundary layer of the fluid separates from the element surface during low velocity conditions of flow. The recessed surface portion meets the downstream surface of the element inwardly of said edge, whereby said edge forms an outer extremity of said element to said fluid flow and compels boundary layer separation.

18 Claims, 12 Drawing Figures

INVENTORS
Hiroo Yamasaki
Yoshio Kurita
Yutaka Ishikawa
BY Takehiro Sawayama

Bryan, Parmelee, Johnson & Bollinger
ATTORNEYS.

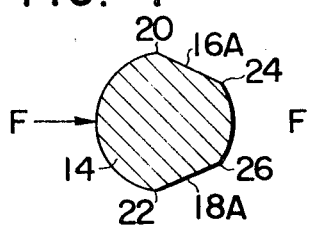
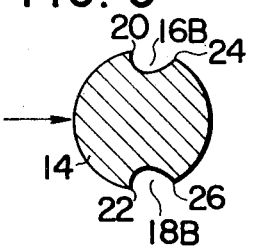
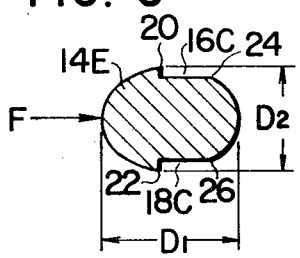
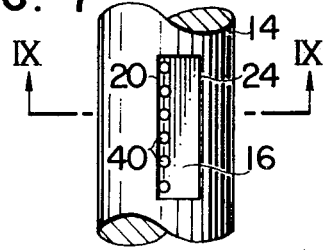
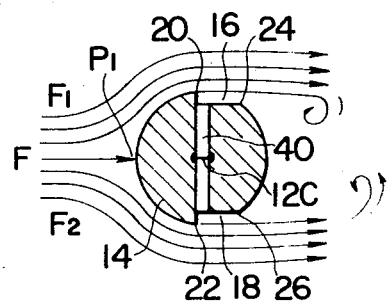
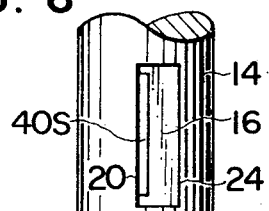
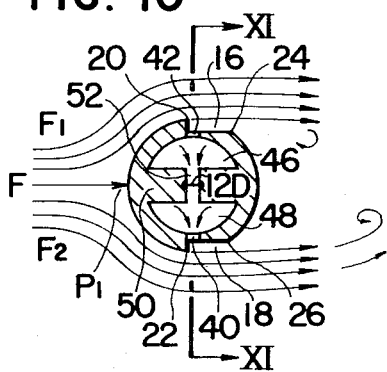
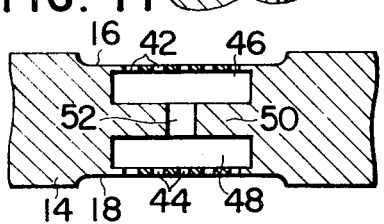
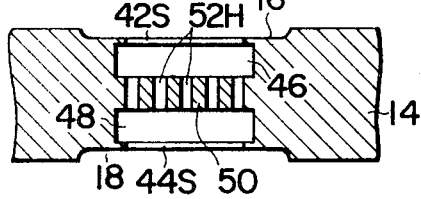

KARMAN'S VORTICES GENERATING DEVICE

BACKGROUND OF THE INVENTION

1. Field of the Invention

This invention relates to flow metering apparatus of the type wherein a cylindrical object in a stream of flowing fluid produces a wake including a distinct pattern of vortices known as the Karman Vortex Street. The vortices are shed from alternate sides of the object in a periodic manner. There is a definite relationship between frequency $f$ of shedding of the vortices, the diameter D of the cylinder, and the velocity V of the stream, expressed by:

$$f = K \cdot V/D$$

where $K$ is a constant when flow is within a range of velocities $V$, and where $K$ is a function of velocity $V$ outside this range. Accordingly, it is possible to determine the flow velocity $V$ by measuring the frequency f of the generation of vortices, and the measurement is straightforward where the conditions of flow make $K$ a constant.

2. DESCRIPTION OF THE PRIOR ART

It has been found that the desired linear relationship between flow velocity $V$ and frequency $f$ of the vortex generation does not apply over the full range of conditions encountered in flow measurement. When a cylinder is immersed in a stream of fluid flowing through a pipe and particularly when flow velocity increases beyond a certain point, $K$ is not a constant and the measurement of vortex production does not simply yield a measurement of velocity. Though the causes of this disparity may not have yet been completely explained, it is believed to result from the uneven velocity distribution of a fluid flowing through a pipe, from the fluctuation and eddies other than Karman's vortices which develop in the flowing fluid, and from the transfer to the downstream side of the cylindrical object of the separating point of the boundary layer of the fluid flowing along the cylindrical surface as the flow velocity increases.

Various arrangements have been proposed for generating Karman's vortices more stably in a flow measurement environment. In one such arrangement disclosed in U.S. Pat. No. 3,564,915 Miyaji Tomota et al., the cylindrical element is formed with a transverse bore or slot intercepting the cylinder surface in the regions where boundary layer separation occurs, with fluid flow alternating through the transverse bore or slot as the Karman's vortices are generated and assisting in causing or retarding boundary layer separation for more reliable vortex production without influence from eddies and other fluid fluctuations.

In another prior art arrangement, disclosed in U.S. Pat. No. 3,116,639 to Bird, the cylindrical object is formed with a cross-sectional shape which reduces flow resistance at high speeds, and avoids deleterious effects on vortex production caused by cavitation, such shapes including a streamlined fore-part (such as a semi-ellipse) with the after part cut away and recessed.

Such prior art apparatus of the general type referred to above has not been fully satisfactory in providing a linear relationship between flow velocity $V$ and the frequency $f$ of vortex generation. While gains have been made in avoiding eddy and cavitation problems, deviations from linearity at high velocities of flow remain present.

SUMMARY OF THE INVENTION

It is a principal object of this invention to provide improved elements for generating Karman's vortices, the frequency of shedding of which is to be detected to measure the velocity of fluid flow. It is a specific object of the invention to provide a vortex generating element which extends the range of flow velocity for which a linear relationship exists between flow velocity and frequency of vortex generation. Still another object of the invention is to provide a vortex generating element of the type described which is more suitable for commercial use.

In a preferred embodiment of the invention to be described hereinbelow in detail, the cylindrical element inserted in the flowing stream is formed on opposing sides with recessed surface portions. These portions meet the upstream portion of the element surface in an edge which lies substantially where the boundary layer of the fluid separates from the surface of the element at fluid velocities in the linear range. The recessed surface portions also meet the downstream portion of the element surface inwardly of said edge, and the edge thus forms an outer discontinuous extremity of the element to said fluid flow to force boundary layer separation. This arrangement affords linearity of operation extending over a broader velocity range. The arrangement further is advantageous in that it can employ a transverse bore arrangement to further assist in controlling boundary layer separation to produce stable Karman's vortices.

Other objects, aspects and advantages of the invention will be pointed out in, or apparent from, the detailed description hereinbelow, considered together with the following drawings.

DESCRIPTION OF THE DRAWINGS

FIGS. 4, 5, and 6 are cross-sectional views like FIG. 3 showing modified versions of the vortex generating element;

FIG. 7 is a view similar to FIG. 2 showing a portion of a modified form of a cylindrical element;

FIG. 8 is a view similar to FIG. 7 showing another modified form of cylindrical element;

FIG. 9 is a cross section taken along line 9—9 of FIG. 7;

FIG. 10 is a cross-sectional view similar to FIG. 9 showing another modified form of vortex generating element;

FIG. 11 is a section on line 11 of FIG. 10; and

FIG. 12 is a view similar to FIG. 11 showing another modified form of the vortex generating element.

DESCRIPTION OF THE PREFERRED EMBODIMENTS

Figure 1:
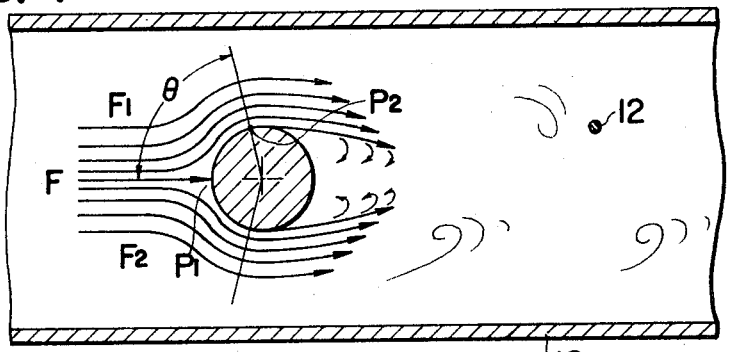
FIG. 1 is a diagramatic illustration of the conventional mode of formation of Karman's vortices and of their detection in flow measuring apparatus.

Referring first to FIG. 1, which illustrates a conventional cylindrical vortex generating element C in a stream of flowing fluid F within a pipe 10, it is known that the fluid F breaks into two streams F1 and F2 at the stagnation point P1 and these two streams flow along the surface of cylinder C. The flow velocity at the cylinder surface increases as the flow moves away from the stagnation point P1, until the boundary layer of the fluid separates from the cylinder surface at a separating point P2. Downstream of the separating point P2 vortices form alternately on opposite sides of cylinder C to produce the characteristic Karman vortex street.

The separating point P2 of the boundary layer is not fixed, but periodically varies its position along the circumference of cylinder C as the alternating vortices are produced, oscillating about an average position which is stationary for a given flow velocity. The average position of separating point P2 also varies its position with flow velocity. When the flow velocity is low, the average separating point P2 is typically located on the upstream surface of cylinder C and is gradually transferred to the downstream surface as the velocity increases. During the flow conditions which produce vortices, it has been found that the position of the separating point P2 is located at an angle $\theta$ within a range of 75° to 105°, where $\theta$ is the angle between the cylinder radius connecting to the point P2 and the cylinder radius connecting to the stagnation point P1.

Variation of the angle $\theta$ with velocity can also be put in terms of the Reynolds number $R = VD/V_k$ where $V$ is the flow velocity, $D$ is the cylinder diameter, and $V_k$ is the kinematic viscosity of the fluid. When the Reynolds number is less than $10^5$, the average position of separating point P2 is located with the range of $\theta$ of 75° to 85°, and when the Reynolds number exceeds $10^5$ as fluid velocity increases, the separating point P2 is transferred to the downstream side of the cylinder where $\theta$ is greater than 90°. At the lower Reynolds number, the frequency of vortex production is substantially linearly related to flow velocity.

The alternately shed vortices from cylinder C travel downstream of the cylinder, where the frequency of their production can be detected by a detecting means 12 positioned to intercept the vortices. The detecting means 12 can be a known arrangement comprising an electrically-heatable wire the ends of which are connected to a sensing circuit outside pipe 10 which produces a flow of electric current through the wire and also measures the change in resistance of the wire resulting from displacement of the fluid accompanying the passage of vortices past the wire.

Figure 2:
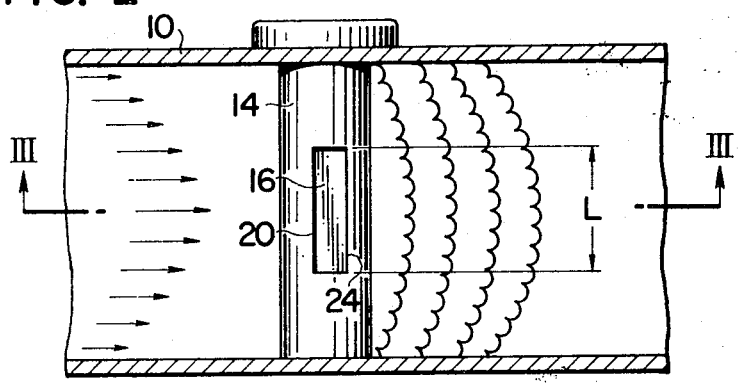
FIG. 2 is a vertical longitudinal section through a fluid flow pipe, showing one form of the improved vortex generating element in elevation.
Figure 3:
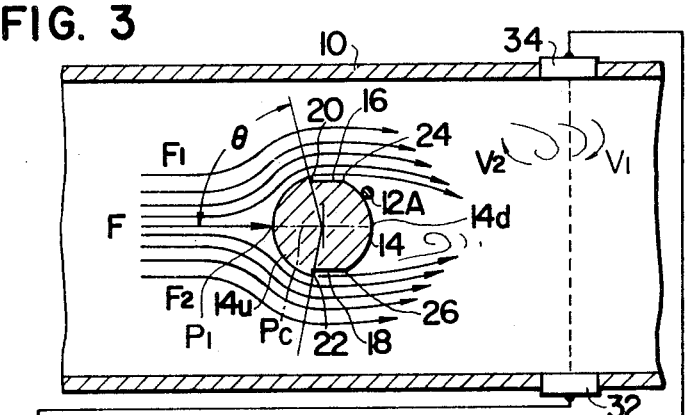
FIG. 3 is a cross section taken along line 3—3 of FIG. 2.

As indicated previously, when flow velocities are high, the conventional cylinder illustrated in FIG. 1 does not provide the desired linear relationship between frequency of vortex generation and flow velocity. Referring now to FIGS. 2 and 3 the present invention provides an improved vortex generating element 14, typically secured in place by attachment to the wall of pipe 10 as shown in FIG. 2. The shape of vortex generating element 14 is generally elongate and cylindrical, but in a region L located centrally in pipe 10, the element 14 has provided thereon on opposite sides a pair of recessed surface portions 16, 18 as shown in cross section in FIG. 3.

The recessed surface portions 16, 18 are formed so as to intersect the upstream surface 14u of element 14 in discontinuities or edges 20, 22 which are located substantially where the boundary layer of the fluid separates from a cylindrical surface under conditions of low fluid velocity which result in the linear relationship between vortex frequency and flow velocity. As shown in FIG. 3, for example, edges 20 and 22 are located at an angle $\theta$ of approximately 75° to 85°.

The recessed surface portions are also formed so that they meet the downstream surface 14d of element 14 in locations 24, 26 which are inward of edges 20, 22, i.e., closer to the plane Pc extending through the cylinder axis and the stagnation point P1, which plane is also the plane of symmetry of the element 14. Thus the edges 20, 22 form the outer extremities of element 14 to the flow of fluid F, which as before breaks into two streams, F1 and F2 as it impinges upon element 14. The streams F1 and F2 flow along the upstream surface 14u until they reach edges 20, 22 where the boundary layer of the fluid separates from the element's surface because of the existence of recesses 16, 18. The surface discontinuity provided by the recesses 16, 18 provides for positive separation of the boundary layer with a concomitant positive and stable generation of Karman's vortices, even at high flow velocities. The element 14 with recesses 16, 18 formed thereon will generate Karman's vortices in a stable manner, largely free of the influences of flow fluctuation and eddy currents in the stream, and will maintain a linear relationship between the frequency of vortex generation and flow velocity over a broad range of flow velocities.

The cross-sectional shape of recesses 16, 18 may vary. In the embodiment shown in FIG. 3, the recesses 16, 18 are formed with two flat, planar surfaces, the rear one parallel to the direction of flow F, and the front one perpendicular to that direction and forming sharp edges 20, 22. Various modifications of the shape of recesses 16, 18 are shown in FIGS. 4 through 6. In the embodiment of FIG. 4, element 14 has recesses 16a, 18a formed of a single flat surface along a chord of the cylinder. In the embodiment of FIG. 5, the element 14 has recesses 16b, 18b formed with curved surfaces which undercut the edges 20, 22. In the embodiment shown in FIG. 6, there is shown an element 14e having an elliptical shape with major axis D1 and minor axis D2, the direction of flow being parallel to the major axis. Recesses 16c, 18c are formed with two flat, planar surfaces, the rear one parallel to the direction of flow and the front one perpendicular to the direction of flow similar to the embodiment of FIG. 3. The upstream edges 20 and 22 of the recesses 16c, 18c are located substantially where the boundary layer of the fluid flow separates at low fluid velocities from the surface of an elliptical cylinder with axes D1 and D2.

Detection of vortices generated by the element 14 can be by use of a detecting means 12 as shown in FIG. 1, or alternatively by use of detecting means 12a shown in FIG. 3. This detecting means is mounted directly on the downstream surface 14d of element 14 and comprises an electrically heated wire sensing the displacement of fluid flowing along the downstream surface, the fluid flow having a variation directly related to the production of Karman's vortices.

Still another detecting means 12b is shown in FIG. 3. (For simplicity, detecting means 12a and 12b are shown in superimposed use in FIG. 3, but they would typically be used independently of one another.) The detecting means 12b detects the passage of Karman's vortices by making use of the vortex property of oppositely directed velocity components $v1$ and $v2$ produced in the fluid F. Detecting means 12b comprises a supersonic pulse generator 30 feeding a transmitter 32 which sends the sound impulses across pipe 10 to a receiver 34. Receiver 34 is connected to an input of the pulse generator 30, which is arranged to emit a new pulse each time one is received from receiver 34. Receiver 34 is also connected to a frequency demodulator 36 whose output is fed to a counter or calculator 38. In operation, detecting means 12b transmits pulses from transmitter 32 to receiver 34; the time required for the transmission will depend on whether there is a velocity component $v1$ from a vortex which delays the transmission, or a velocity component $v2$ which hastens the transmission. As a result, receiver 34 will provide a signal which is frequency modulated by the passage of Karman's vortices. This signal is demodulated by the demodulator 36 whose output is used in counter or calculator 38 to provide a measure of fluid flow.

FIGS. 7 through 12 show alternate embodiments of the invention in which the element 14 is provided with passages extending between the recesses 16, 18 to communicate fluid fluctuations therebetween. Referring to FIG. 7, the element 14 has a set of holes 40 extending between the recesses 16, 18. The holes 40 are arranged in a straight line parallel to the axis of the element 14, and are positioned adjacent the edges 20, 22 where boundary layer separation occurs. As shown in FIG. 9, the fluid F impinging against the element 14 breaks into two streams F1 and F2, the boundary layers of which separate from the element's surface at the edges 20, 22. When the vortices are shed from element 14, corresponding pressure fluctuations are produced next to the adjacent openings of the holes 40. Since the vortices are shed alternately from opposite sides of the element 14, the pressures within the recesses 16, 18 also will fluctuate in an alternating fashion. These pressure fluctuations cause fluid to be displaced (i.e. to flow) through the holes 40 in an alternating fashion, first in one direction and then a reversed direction. The rate of pressure alternation is proportional to the rate of generation of vortices, and this in turn is proportional to the rate of fluid flow through the pipe. To detect fluid flowing through the holes 40, as shown in FIG. 9, a detecting means 12c may position an electrically heated wire within the holes 40 to be responsive to the fluid flow without interfering with it.

The holes 40 combine with recessed portions 16, 18 to improve the stable formation of Karman's vortices. Generally, when the boundary layer of a fluid flowing along the surface of an object is in a condition to separate easily from the surface, flow of fluid outwardly against the layer encourages its separation, and conversely, withdrawing fluid from the layer has the effect of retarding separation. Accordingly, the provision of holes 40 adjacent the edges 20, 22 assists in controlling separation of the boundary layer to thereby further improve the stability and reliability of vortex formation.

Referring to FIG. 8, an alternate embodiment of the invention is shown in which a slot 40s, arranged parallel to the element axis, extends between the recessed portions 16, 18 instead of the set of holes 40.

In FIGS. 10 and 11, an alternate embodiment is shown in which the element 14 is formed on opposite sides thereof with respective sets of holes 42 and 44. Each set of holes is arranged within a recess 16, 18 adjacent an edge 20, 22 in a straight line parallel to the axis of the cylinder and communicates with a corresponding interior cavity 46, 48.

These cavities are separated by a central partition 50 having an opening 52 serving as a passageway to accommodate the flow of fluid therebetween. The interior cavities 46, 48, by equalizing pressure, provide a uniformity of flow distributed along the axis of element 14, and thus contribute to stable formation of Karman's vortices over the axial distance L (FIG. 2) notwithstanding a variable velocity distribution across the diameter of pipe 10. As shown in FIG. 10, the alternating flow of fluid through opening 52 can be detected by means 12d positioning an electrically heated wire in the opening. Referring to FIG. 12, the rows of holes may be replaced by slots 42s and 44s, and the partition opening may comprise a set of holes 52h arranged parallel to the element axis.

In addition to the various detection means illustrated in FIGS. 1, 3, 9, and 10, the detection of fluid flow with elements having interior cavitites 46, 48 may also be by detection means positioned in a chamber connected to but remote from said cavitites, as disclosed in co-pending application of H. Yamasaki et al., Ser. No. 108,731, filed Jan. 22, 1971.

Also, detection may be of the vortex interference pattern produced by two elements used in tandem, one upstream of the other, one or both of the elements being constructed according to FIGS. 2-12.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. A vortex generation element of the type used in flow metering apparatus and having a generally elongate cylindrical shape placed transversely in a stream of fluid to produce on opposite sides of the element vortices which are shed in alternating fashion, the flow metering apparatus having means for measuring the frequency of vortex production to determine the velocity of the fluid stream, such element being characterized in that:
   the element has formed on opposite sides thereof a recessed surface portion
   meeting the upstream surface of the element in an edge located at an angle, measured from the edge to the cylinder center to the cylinder stagnation point, lying within the range of angles at which the boundary layer of the fluid separates from the surface of an unrecessed cylindrical element at fluid velocities for which the rate of vortex production is substantially linearly related to fluid velocity; and
   meeting the downstream surface of the element inwardly of said edge, whereby said edge forms an outer extremity of said element to said fluid flow.

2. An element as claimed in claim 1 wherein said edge is located at an angle of between approximately 70° and 105° measured from the edge to the cylinder center to the cylinder stagnation point.

3. An element as claimed in claim 2 wherein said angle is within the range of 75° to 85°.

4. An element as claimed in claim 1 wherein said recessed surface portion is formed of at least one flat plane.

5. An element as claimed in claim 4 wherein said recessed portion is formed of two flat planes, the rear one of which is parallel to the direction of fluid flow and the front one of which is perpendicular to the direction of fluid flow.

6. An element as claimed in claim 1 wherein said recessed portion is formed of a curved surface.

7. An element as claimed in claim 1 wherein said cylinder is a right circular cylinder.

8. An element as claimed in claim 1 wherein said cylinder is an elliptical cylinder.

9. An element as claimed in claim 1 wherein said element further comprises means extending through said element between said recessed portions for communicating fluid fluctuations therebetween.

10. An element according to claim 9 wherein said communication means comprises a row of openings in said recessed portions arranged parallel to said element axis.

11. An element as claimed in claim 9 wherein said communicating means comprises a pair of interior cavities separated by a partition having a passageway therethrough, an opening means connecting said cavities with said recessed surface portions.

12. An element as claimed in claim 11 wherein said opening means comprises a row of holes.

13. An element as claimed in claim 11 wherein said opening means comprises a slot.

14. An element as claimed in claim 11 wherein said passageway comprises a row of holes.

15. An element according to claim 11 wherein said measuring means is mounted in said passageway for detecting the fluid fluctuations therein.

16. An element as claimed in claim 9 wherein said measuring means is mounted in said communicating means for detecting the fluid fluctuations therein.

17. An element as claimed in claim 1 wherein said measuring means is mounted on the downstream surface of said element for detecting fluid fluctuation therealong.

18. An element according to claim 1 wherein said measuring means is located downstream of said element, said measuring means comprising means transmitting a sound impulse transverse to the path of said vortices, and means responsive to variations in the transmission times of said impulses caused by the passage of said vortices.

* * * * *